Dec. 28, 1943.  W. D. YERRICK ET AL  2,337,956
ROTARY REACTOR
Filed June 12, 1942  4 Sheets-Sheet 1
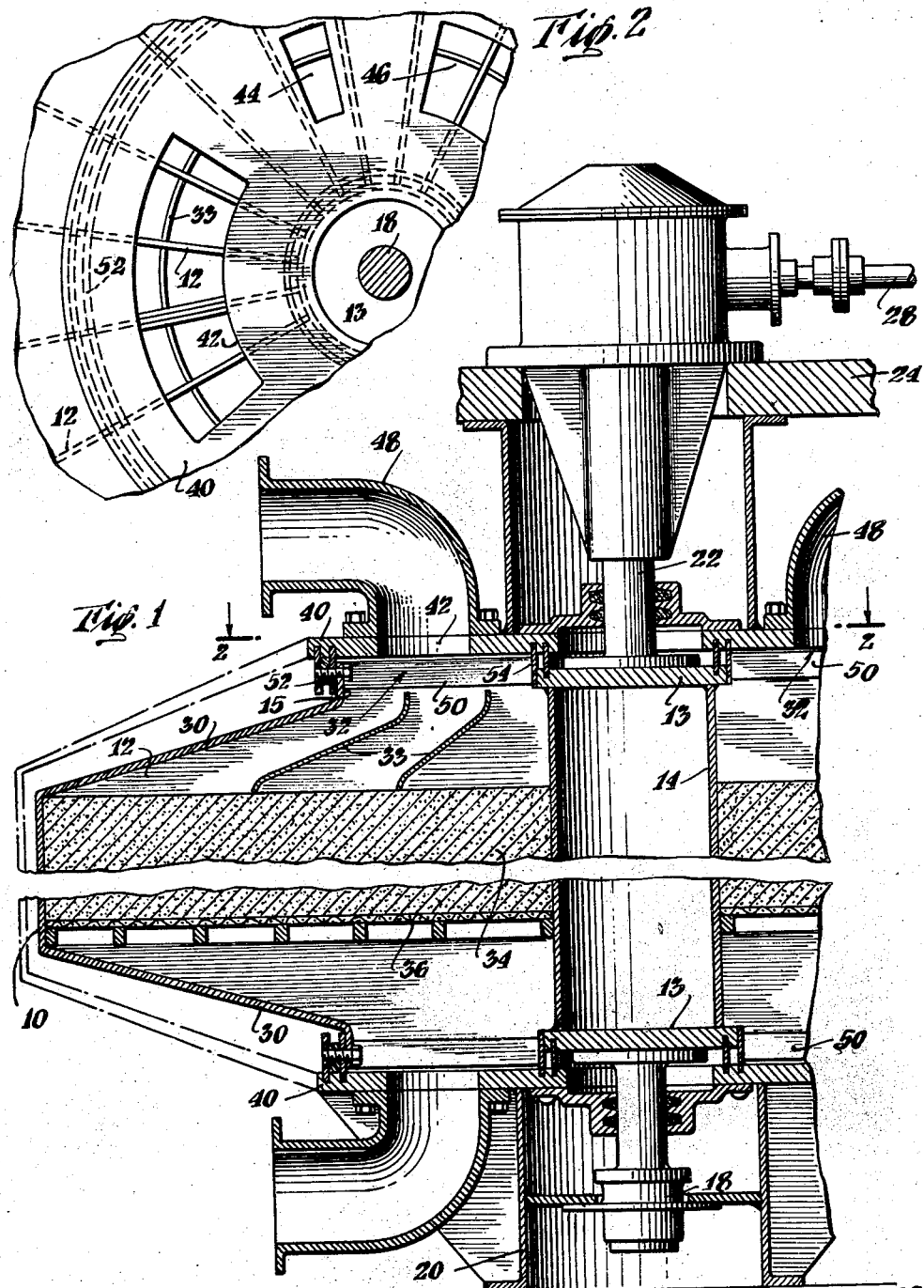
INVENTORS
WILLIAM D. YERRICK
ERNEST A. LUNDSTROM
BY
ATTORNEY

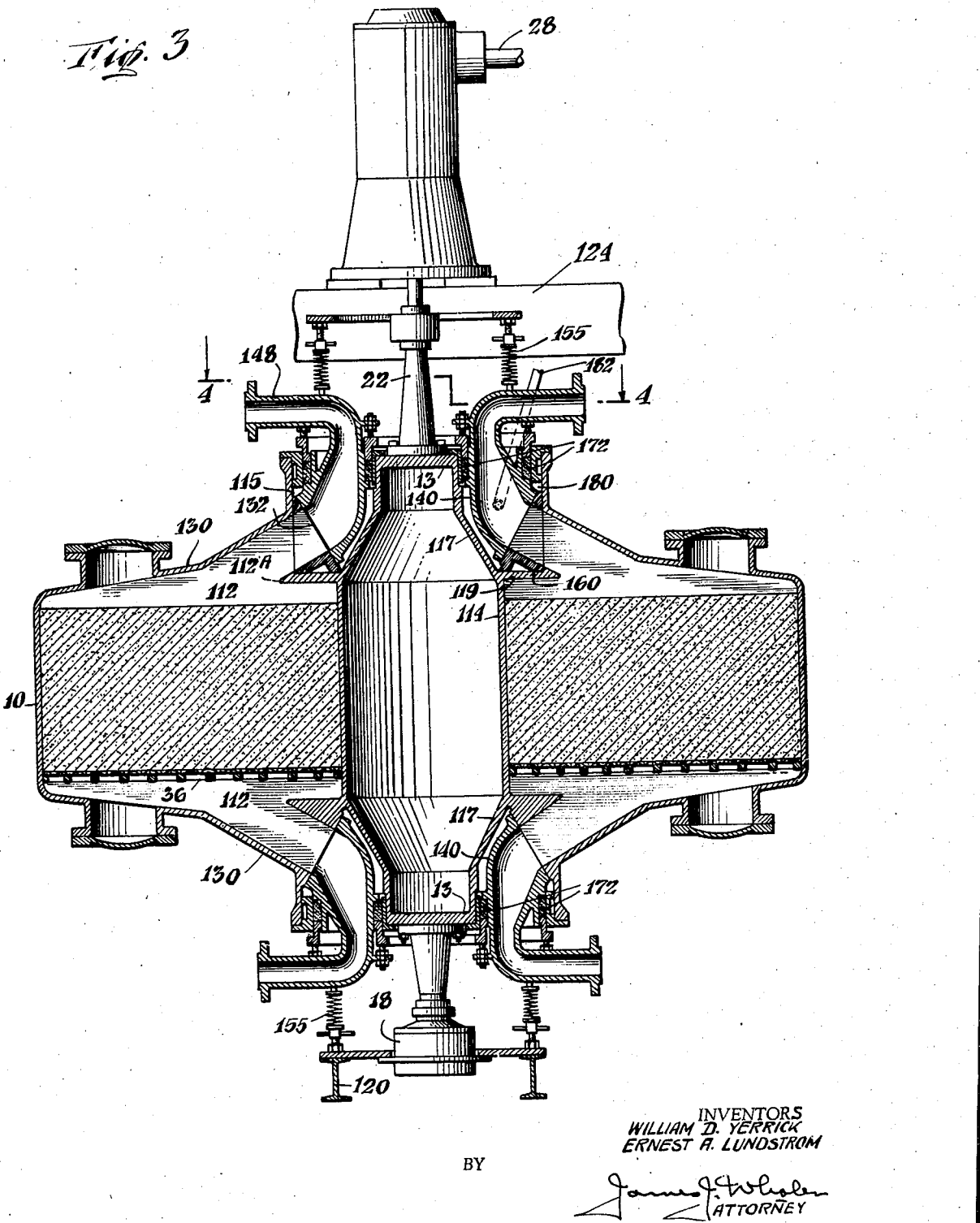

Dec. 28, 1943. W. D. YERRICK ET AL 2,337,956
ROTARY REACTOR
Filed June 12, 1942 4 Sheets-Sheet 3
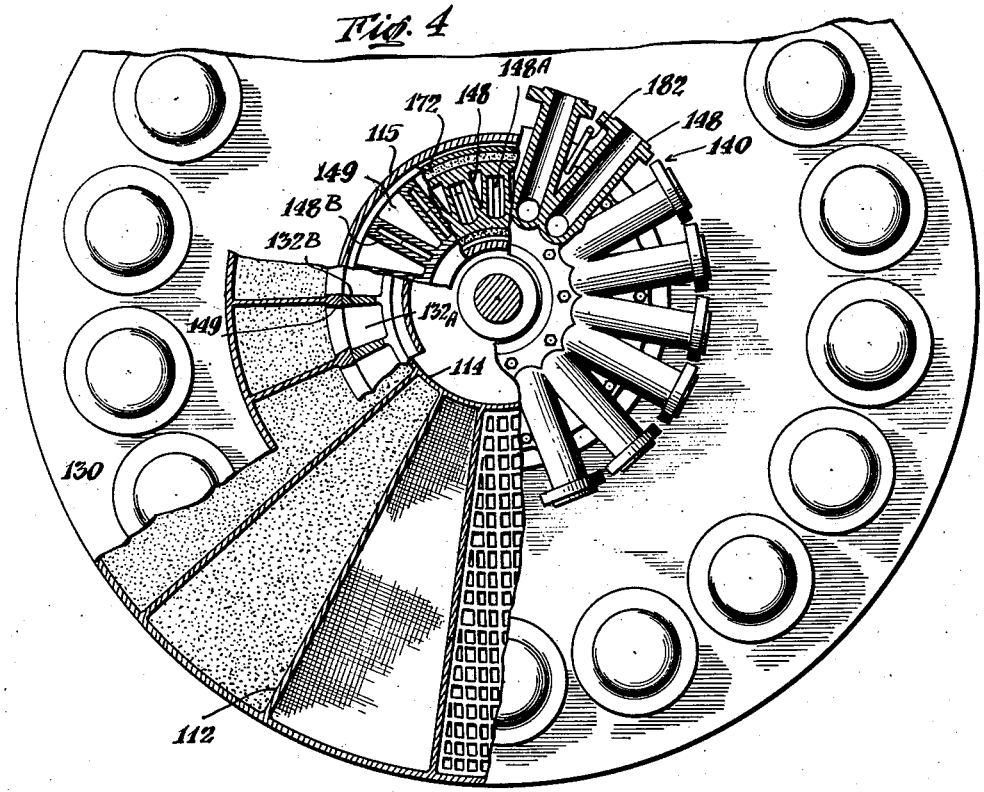
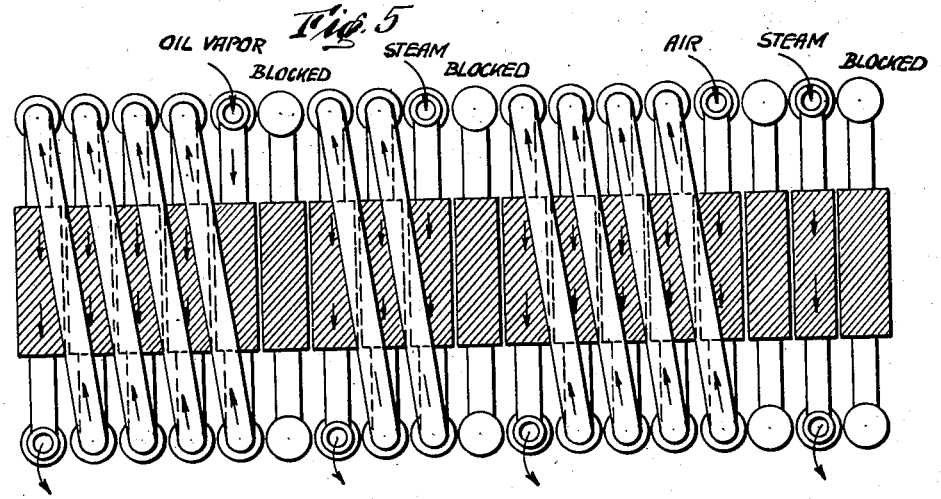
INVENTORS
WILLIAM D. YERRICK
ERNEST A. LUNDSTROM
BY
ATTORNEY

INVENTORS
WILLIAM D. YERRICK
ERNEST A. LUNDSTROM
BY
ATTORNEY

Patented Dec. 28, 1943

2,337,956

UNITED STATES PATENT OFFICE 2,337,956

ROTARY REACTOR

William D. Yerrick and Ernest A. Lundstrom, Wellsville, N. Y., assignors to The Air Preheater Corporation, New York, N. Y.

Application June 12, 1942, Serial No. 446,834

4 Claims. (Cl. 34—187)

The present invention relates to an improvement in the sealing means between a rotor carrying chemically reactant material or heat transfer elements and a stationary member having ports for directing gaseous fluids into contact with the reactant material or heat transfer plates.

In regenerative preheaters of the Ljungstrom type, such as shown in Patent No. 1,522,825, issued January 13, 1925, wherein a compartmented rotor carries heat transfer plates through a gas passage to absorb heat and then into an air passage to impart the heat to air flowing therethrough it is necessary to provide circumferentially extending sealing means between the end portions of the rotor and stationary "sector plates" formed with ports for directing gas and air to the rotor and to which the fluid supply conduits are connected. Such seals are also required where the rotor instead of carrying heat transfer plates is charged with a reactant material such as fuller's earth over which hydrocarbon gases are directed. The present invention contemplates improving such sealing means and reducing the cost thereof. This is effected by providing the rotors of such apparatus with neck portions which are of reduced size compared with the diameter of the rotor body thereby substantially reducing the area of the opposed surfaces of the rotor and the stationary plates which are in contact or which are provided with interposed sealing members to avoid leakage.

The invention will be best understood upon consideration of the following detailed description of several illustrative embodiments thereof when read in conjunction with the accompanying drawings in which:

Figure 1 is an elevational view, partly in section, of a chemical reactor embodying an improved sealing arrangement between the rotor which carries the reactant material and the stationary fluid supply connections;

Figure 2 is a sectional view on the line 2—2 in Fig. 1;

Figure 3 is a vertical sectional view of another form of chemical reactor embodying the invention;

Figure 4 is a sectional view on the line 4—4 in Fig. 3;

Figure 5 is a diagrammatic view illustrating a preferred sequence of fluid flow through the apparatus;

Figure 6:
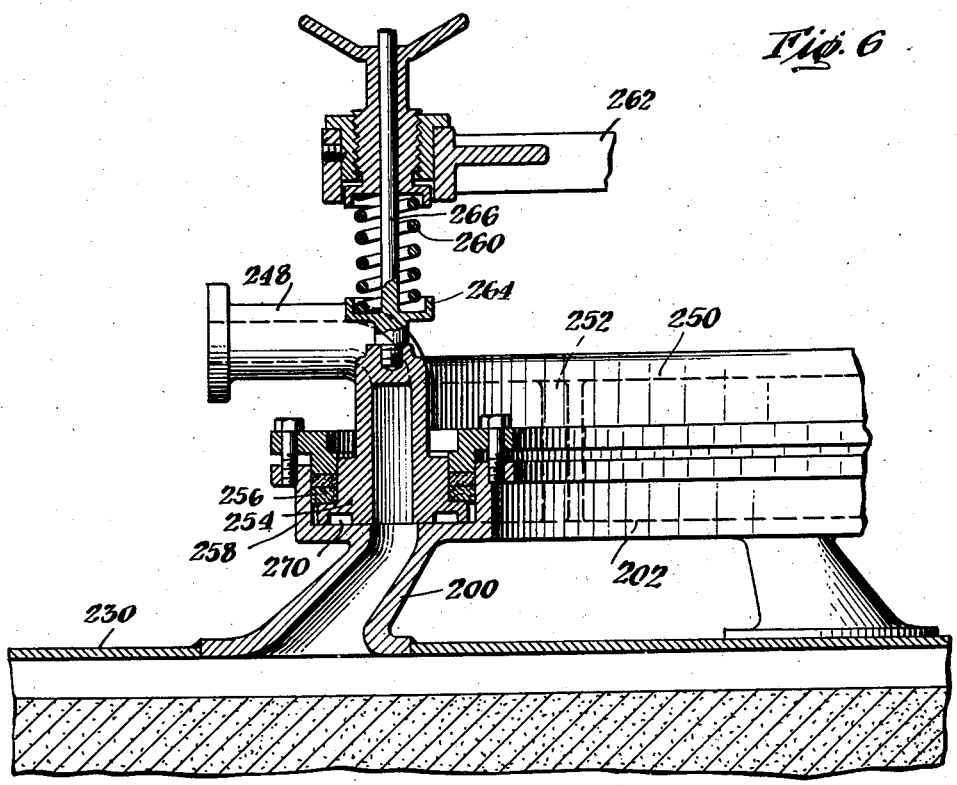
Figure 6 is a fragmentary sectional view of a further arrangement for establishing communication between the stationary fluid supply connections and the rotor chambers that carry the reactant material.

Referring first to Figs. 1 and 2 of the drawings, the rotor of the apparatus is a cylindrical shell 10 subdivided into sector-shaped compartments by radially extending partitions 12 which also serve to connect the shell to the centrally located rotor post 14. The rotor post 14 is hollow and closed at either end as by plates 13. At its lower end the rotor post is connected to a guide bearing 18 mounted in a fixed support 20. The upper end of rotor post 14 is attached to a shaft 22 providing means for suspending the rotor from a fixed support 24. Shaft 22 is operatively connected to reduction gearing mounted on the support 24 and driven through a shaft 28 by a motor 29.

At each end the rotor is provided with end plates 30 extending from the upper and lower edges of the cylindrical shell 10 toward rotor post 14. The end plates 13 terminate at a distance radially outward of the rotor post 14 and have upturned flanges 15 which with the edges of plates 13 define annular openings at the ends of the rotor. Thus, the end plates 30 are formed to provide centrally located neck portions of reduced area compared to the cross-section of the rotor body. Expressed differently, the openings 32 at either end to the interior of the rotor are of materially smaller radial extent than that of the rotor compartments.

In Fig. 1, the end plates 30 are divergently inclined and this results in the central portion of the rotor being of greater depth than the outer parts so that space may be left for gaseous fluids to flow outward toward shell 10 so they may pass through the parts of a mass 34 of reactant material supported on a grid 36 at the outer parts of the compartments as well as the parts directly aligned with the openings 32. The reactant material is introduced (or removed) through covered holes in the end plates of the housing as appears in Fig. 3.

Because openings 32 through which the various fluids enter and leave the rotor are much narrower than the radial dimension of the compartments, deflector plates 33 are provided in the rotor of Fig. 2 to insure a substantially uniform distribution of the fluids to the material carried in the rotor compartments. As shown, these deflectors extend downwardly from the lower edges of radial seals 50 in radially spaced relation and are inclined outwardly towards the shell 10. Though each of the radially spaced baffles extends circumferentially about the rotor, it is necessary to divide them into arcuate sections because of the radial partition plates 12 that subdivide the rotor ends into compartments.

Supported opposite the ends of the rotor, as from the supports 24, 20 above and below, are sector plates 40 formed with ports 42, 44, 46 to which conduits 48 are connected for circulating various fluids such as hydrocarbon vapor, air and steam through the reactant material carried by the rotor.

The partitions 12 are provided along their top and bottom edges with radially extending sealing members 50 wiping against the opposed surface of the sector plates as is customary in regenerative heaters of the Ljungstrom type. Circumferential seals 52 are interposed between the sector plates 40 and the rotor end plates 30 (of the rotor) adjacent the outer edge of the end openings 32 of the latter. As shown the seals are attached to the flanges 13 on the end plates 30 along the outer edges of the openings 32 and ride in channels in the sector plates 40. Similar circumferential seals 54 of smaller diameter are provided between these parts at the inner edge of the openings 32.

The apparatus shown in Figs. 3 and 4 is generally similar to that illustrated in Figs. 1 and 2 but differs particularly from the latter in omitting the conventional circumferential seals and locating the openings 132 that provide communication to the interior of the rotor in planes inclined to the axis of the rotor and facing the centrally located rotor post 114. Extended portions 117 of the hollow rotor post 114 together with flanges 115 on the end plates 130 define annular chambers surrounding the upper and lower portions of the rotor post. Mounted in each of these annular chambers but spaced somewhat from its walls 115, 117 is a fluid distributing manifold 140. Each manifold consists of a plurality of conduits 148 joined at their lower ends to form an integral structure, one conduit being provided for each compartment into which the rotor is subdivided by the radial partitions 112. As appears in Fig. 4 the conduits 148 though circular at their outer flanged ends are gradually narrowed to slots at 148A. The conduit section assumes a rectangular form so that at the point where a stationary manifold contacts the ported face of the reduced neck portion of the rotor the conduit passages are elongated slots. These slots are of course no wider than either the ports 132A nor the intervening partitions 132B subdividing the end openings 132 of the rotor; the slots are separated by imperforate web portions 149 located at the lower end of the manifold in planes parallel to the planes of the inclined face of the reduced neck portion of the rotor.

As appears in Fig. 3 the rotor post 114 has short radial extensions 119 against which are seated removable wear rings 160 formed with ports 132A for each rotor compartment. During rotation of the rotor cross flow of fluid from a compartment to those adjacent is prevented by the diaphragms 132B (Fig. 4) that separate ports 132A and wipe against the opposed face of the imperforate web portions 149 between the conduit sections of the manifold.

Adjustable compression springs 155 mounted between the supports 120, 124 and the outer parts of the manifolds press the lower ends of the latter against the opposed faces of the wear rings 160 to maintain a good sealing contact between the two. Packing rings 172 are provided between the manifolds and the flanges 115, 117 of the end plates and post, being held in place by suitable retainers which need not be described in detail. However, the primary means of preventing leakage to the atmosphere from the chambers in which the manifolds are located, or from the rotor, consists in supplying steam or other gaseous fluid under pressure through a connection 182 to the spaces 180 left between the annular body of the manifold and the walls of the annular chamber in which it is mounted.

Figure 7:
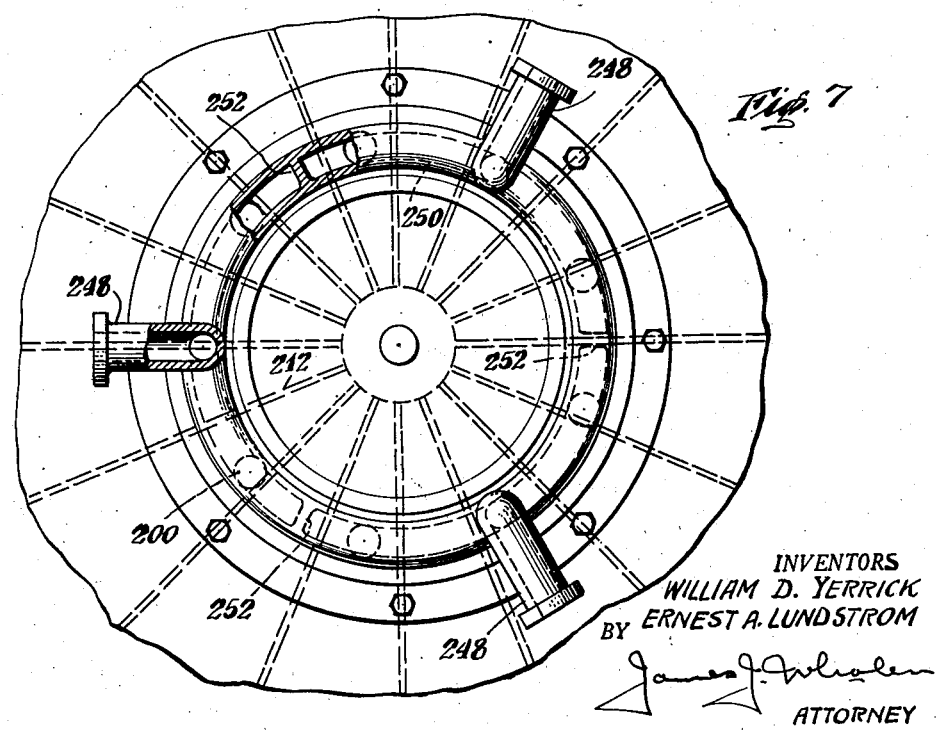
Figure 7 is a plan view on a reduced scale of a reactor embodying the construction shown in Fig. 6.

In another form of construction as illustrated in Figs. 6 and 7 each compartment into which the rotor is divided by radially extending partitions is provided at its upper end with a pipelike neck 200 projecting upwardly from the end plate 230 of the rotor. The various necks 200 for compartments spaced circumferentially about the rotor all open at their upper ends into the bottom of an annular trough 202. The supply pipes 248 for the various fluids are connected to an annular manifold 250 having a number of radially extending partitions 252 (Fig. 7) subdividing its interior. The manifold 250 has a base portion 254 seating within the circular trough 254 and is open at the bottom so that as the rotor turns beneath the manifold 250 each pipe 248 may supply fluid to several rotor compartments through the related necks 200 then registering with a manifold chamber located between the adjacent partitions 252 at opposite sides of the pipe. Circumferential sealing or packing rings 256 are provided between the side walls of the base 254 of the manifold 250 and the interior faces of the walls 258 defining the annular trough 202. The contacting surfaces between the stationary manifold 250 and the base of the rotating annular trough 202 are maintained at a desired sealing pressure by adjusting the compression of springs 260 mounted between a stationary member 262 above the manifold 250 and collars 264 on spindles 266 that bear at their lower end against the manifold 250. To further insure against leakage to the outside circumferential sealing groves 270 are provided in the underside of the manifold base 254. These grooves are supplied with steam at a minimum pressure equal to the pressure of the reacting fluids. In instances where steam is one of the fluids circulated through the reactant material in the rotor, the grooves 270 may extend circumferentially of the base 254 of the manifold 250 to communicate with the chambers thereof to which steam is supplied by a pipe 248. At the underside of the rotor a similar construction is provided to establish communication between the rotor compartments and pipes connecting into a stationary header located beneath the rotor.

Inasmuch as all the pipe connections for circulating various fluids through the rotor are stationary and accessible the flow of the several fluids passing through the reactant material or catalyst can be so arranged that they enter at the top of the rotor, then after passing through one compartment may flow upwards through a pipe outside the rotating vessel and again pass downwards through the next sector. Such a flow sequence is indicated in Figure 5.

The reactor constructions described above permit the fluids which are to be brought into contact with a reactant material to be passed through the reactor in practically any flow path that is desired. In other words, a particular fluid may be caused to flow through one compartment and then from the outlet of the latter into and through the next adjacent compartment or one spaced at any desired interval therefrom. Likewise by interconnecting various inlet pipes and corresponding outlet pipes together to a common chamber so as to form a header, any fluid may be circulated simultaneously through a desired number of chambers which may be located either immediately adjacent each other or spaced apart at various intervals about the circumference of the reactor. Likewise, although for particular reactions it may be desirable to supply the various fluids to the compartments at particular intervals the fact that the reactor has inlet and outlet connections corresponding in number to the various compartments of the rotor permits interconnection of the compartments as desired simply by rearranging external pipe connections.

Although the rotor has been stated to carry a mass of reactant material in each of the compartments, the latter alternatively may contain heat transfer plates supported in the manner usually adopted in regenerative preheaters of the Ljungstrom type.

In the form illustrated the rotor is not enclosed in a housing as is usual in Ljungstrom preheaters but turns between the stationary sector plates 40 which are the equivalent of the ported end closures of a preheater housing. However a stationary housing or guard frame may be provided around the rotor if desired as indicated by dotted lines in Fig. 1.

It will be noted that because the radial extent of the openings 32 through which the fluids enter and leave the rotor near its center are of much smaller radial extent than the radial dimension of the compartments of the rotor, the diameter and hence the circumferential length of the seals located at the outer edge of the end openings 32 between the sector plates 40 and the end plates 30 of the rotor is much less than where the ports are of substantially the same radial extent as the radial depth of the rotor compartments. Thus not only is the possibility of leakage minimized because of the reduction of the area of the sealing surfaces but the cost of manufacturing and maintaining the apparatus is lowered.

What we claim is:

1. In apparatus of the type described; a rotor having a shell interiorally divided by radial partitions into a plurality of compartments containing material to be contacted by fluids circulated through the rotor, grid means supporting said material, and a centrally located rotor post to which said rotor is attached; plates closing the ends of said rotor extending from the edges of said shell toward and terminating radially outward of said rotor post; flange means cooperating with said plates to form centrally located annular neck portions about said rotor post; other means associated with said plates and said rotor post cooperating to provide ported surfaces opening into the rotor; fluid circulating manifolds mounted within said neck portions each having a plurality of fluid ports formed in an end surface parallel to the ports of said rotor; and means maintaining the ported surfaces of said rotor and manifolds in engagement.

2. In apparatus of the type described; a rotor having a shell interiorally divided by radial partitions into a plurality of compartments containing material to be contacted by fluids circulated through the rotor, grid means supporting said material, and a centrally located rotor post to which said rotor is attached; plates closing the ends of said rotor extending from the edges of said shell toward and terminating radially outward of said rotor post, flange means at the inner edges of said plates arranged to form centrally located annular neck portions; means cooperating with said plates to form ported surfaces on the rotor located in planes facing said rotor post; fluid circulating manifolds mounted within said neck portions each having a plurality of fluid ports formed in an end surface parallel to the ported surfaces of said rotor; said manifolds being spaced from the side walls of said neck portions; means maintaining the ported surfaces of said neck portions and manifolds in engagement; fluid tight packing interposed between the outer portions of said manifolds and the adjacent walls of said annular neck portions; and means for supplying a fluid under pressure to the space between said annular neck portions and said manifold.

3. In apparatus of the type described; a rotor having a shell interiorally divided by radial partitions into a plurality of compartments containing material to be contacted by fluids circulated through the rotor, grid means supporting said material, and a centrally located rotor post to which said rotor is attached; plates closing the ends of said rotor extending from the edges of said shell toward and terminating radially outward of said rotor post to form centrally located circular neck portion of materially smaller radius than the radial extent of said compartments; stationary sector plates overlying the openings at opposite ends of said rotor and each having a port formed therein for each compartment; conduits connected to the ports at each end of said compartments for circulating fluid therethrough; and piping connecting the conduits located at one end of the rotor corresponding to certain compartments with conduits located at the opposite end of the rotor and corresponding to other compartments.

4. In apparatus of the type described; a rotor having a shell interiorally divided by radial partitions into a plurality of compartments containing material to be contacted by fluids circulated through the rotor, grid means supporting said material, and a centrally located rotor post to which said rotor is attached; plates closing the ends of said rotor extending from the edges of said shell toward and terminating radially outward of said rotor post to form centrally located circular neck portions of materially smaller radius than the radial extent of said compartments; stationary sector plates overlying the openings at opposite ends of said rotor and each having a port formed therein for each compartment; conduits connected to the ports at each end of said compartments for circulating fluid therethrough; and piping connecting the conduits located at one end of the rotor corresponding to certain compartments with conduits located at the opposite end of the rotor and corresponding to other compartments each immediately adjacent one of said first compartments so as to connect a plurality of adjacent conduits in series for series flow of fluids therethrough.

WILLIAM D. YERRICK.
ERNEST A. LUNDSTROM.